United States Patent [19]

Schroeck

[11] Patent Number: 4,959,168

[45] Date of Patent: Sep. 25, 1990

[54] SULFURIZED COMPOSITIONS, AND ADDITIVE CONCENTRATES AND LUBRICATING OILS CONTAINING SAME

[75] Inventor: Calvin W. Schroeck, Eastlake, Ohio

[73] Assignee: The Lubrizol Corporation, Wickliffe, Ohio

[21] Appl. No.: 144,369

[22] Filed: Jan. 15, 1988

[51] Int. Cl.$^5$ ............................. C10M 135/02
[52] U.S. Cl. .................... 252/48.6; 252/48.2
[58] Field of Search ..................... 252/48.2, 48.6

[56] References Cited

U.S. PATENT DOCUMENTS

| | | | |
|---|---|---|---|
| 2,113,811 | 4/1938 | Lincoln et al. | 87/9 |
| 2,541,789 | 2/1951 | Stucker | 252/46.6 |
| 2,542,161 | 2/1951 | Stucker | 252/46.6 |
| 2,672,444 | 3/1954 | Wasson et al. | 252/33.4 |
| 2,680,718 | 6/1954 | Eby | 252/48.6 |
| 2,845,438 | 7/1958 | Dearborn | 260/327 |
| 3,455,830 | 7/1969 | Laurence et al. | 252/48.6 |
| 3,455,896 | 7/1969 | Den Herder | 260/125 |
| 3,825,495 | 7/1974 | Newingham et al. | 252/32.7 E |
| 3,926,822 | 12/1975 | Habiby | 252/48.6 |
| 3,953,347 | 4/1976 | Habiby | 252/48.6 |
| 3,986,966 | 10/1076 | Wakim | 252/48.6 |
| 4,053,427 | 10/1977 | Hotten | 252/48.6 |
| 4,166,795 | 9/1979 | Recchuite | 252/48.6 |
| 4,166,796 | 9/1979 | Recchuite | 252/48.6 |
| 4,166,797 | 9/1979 | Recchuite | 252/48.6 |
| 4,176,072 | 11/1979 | Jackesch | 252/32.7 E |
| 4,180,466 | 12/1979 | Newingham et al. | 252/48.6 |
| 4,321,153 | 3/1982 | Recchuite | 252/48.6 |
| 4,456,540 | 6/1984 | Recchuite | 252/48.6 |
| 4,487,705 | 12/1984 | Recchuite | 252/46.6 |
| 4,594,171 | 6/1986 | Horodysky | 252/49.6 |
| 4,708,753 | 11/1987 | Forsberg | 252/309 |

FOREIGN PATENT DOCUMENTS

| | | |
|---|---|---|
| 0009701 | 4/1980 | European Pat. Off. . |
| 2243981 | 4/1972 | Fed. Rep. of Germany ..... 252/48.2 |
| 2842138 | 4/1980 | Fed. Rep. of Germany ..... 252/48.2 |
| 86/06371 | 11/1986 | PCT Int'l Appl. . |

*Primary Examiner*—Olik Chaudhuri
*Assistant Examiner*—James M. Hunter, Jr.
*Attorney, Agent, or Firm*—Joseph P. Fischer; Frederick D. Hunter; Robert A. Franks

[57] ABSTRACT

Sulfurized mixtures which include (A) at least one partial fatty acid ester of a polyhydric alcohol, and (B) at least one member of the group consisting of (1) at least one fatty acid ester of a polyhydric alcohol, which fatty acid ester is different from the partial ester (A),
(2) at least one fatty acid,
(3) at least one olefin, and
(4) at least one fatty acid ester of a monohydric alcohol.

The sulfurized compositions are useful in preparing additive concentrates and lubricating compositions.

41 Claims, No Drawings

SULFURIZED COMPOSITIONS, AND ADDITIVE CONCENTRATES AND LUBRICATING OILS CONTAINING SAME

FIELD OF THE INVENTION

This invention relates to sulfurized compositions. In particular, this invention relates to sulfurized mixtures, which mixtures include at least one partial fatty acid ester of a polyhydric alcohol and at least one additional reactant as described hereinbelow. The sulfurized compositions are useful as additives for lubricating oils. Additive concentrates and lubricating oil compositions containing such sulfurized compositions are also contemplated.

BACKGROUND OF THE INVENTION

In the past, sulfurized sperm oil was widely used as an additive in many lubricant formulations such as gear oil, including lubricants for worm and spur gears, automatic transmission fluids, metal-working lubricants and the like. Sulfurized sperm oil is especially useful for improving extreme pressure properties while providing excellent lubricity and some degree of rust-inhibition in motor oils, gear lubricants, and rolling oils. However, the sulfurized sperm oils have been replaced in recent years by other sulfurized compositions as a result of the reduction in availability of sperm oil and increased cost. Sulfurized olefins do not always exhibit the degree of lubricity which is necessary in many applications.

Habiby, in U.S. Pat. Nos. 3,926,822 and 3,953,347, describes a composition comprising a sulfurized mixture of a fatty acid ester of a mono- or polyhydric alcohol, a fatty acid and an aliphatic olefin. Newingham et al, in U.S. Pat. Nos. 3,825,495 and 4,180,466, teaches lubrication of controlled-slip differentials with a composition comprising a co-sulfurized blend of a triglyceride and a monoolefin. Recchuite, in a series of U.S. Pat. Nos., for example, patent numbers U.S. Pat. No. 4,166,796, U.S. Pat. No. 4,166,797, U.S. Pat. No. 4,321,153 and U.S. Pat. No. 4,456,540 teaches compositions comprising a co-sulfurized mixture of triglycerides and an olefinic hydrocarbon. The '540 patent also recites the presence of a fatty acid in the reaction mixture. In U.S. Pat. No. 4,166,795, Recchuite teaches the reaction product of sulfur, lard oil, polyisobutylene oligomers and optionally another unsaturated material. All of these patents describe the use of these sulfurized mixtures in lubricants. Other sulfurized fatty acid esters are described in Lincoln et al, U.S. Pat. No. 2,113,811; Wasson et al, U.S. Pat. No. 2,672,444; Eby, U.S. Pat. No. 2,680,718; Wakim, U.S. Pat. No. 3,986,966; Zipf, U.S. Pat. No. 4,036,769; Hotten, U.S. Pat. No. 4,053,427; and Jackisch, U.S. Pat. No. 4,176,072. The sulfurization described in the above-identified patents generally is carried out using elemental sulfur. Several patents describe alternative means of incorporating sulfur including reactions with sulfur monochloride and phosphosulfurization carried out by addition of small amounts of a phosphorus sulfide.

SUMMARY OF THE INVENTION

Sulfurized compositions are described which are prepared by reacting at an elevated temperature, a sulfurizing agent with a mixture of
(A) at least one partial fatty acid ester of a polyhydric alcohol and
(B) at least one member of the group consisting of
  (1) at least one fatty acid ester of a polyhydric alcohol, which fatty acid ester is different from the partial ester (A),
  (2) at least one fatty acid,
  (3) at least one olefin, and
  (4) at least one fatty acid ester of a monohydric alcohol.

The sulfurized compositions prepared in accordance with the present invention are useful as additives for lubricating oil compositions, providing extreme pressure, antiwear, antioxidant, and increased lubricity properties.

Thus, it is an object of this invention to provide novel sulfurized compositions. A further object is to provide a method for preparing novel sulfurized compositions. Still another object is to provide useful lubricant additives. Other objects will in part be apparent to those skilled in the art upon reading this disclosure or are described in detail hereinbelow.

DETAILED DESCRIPTION OF THE INVENTION

As previously described, this invention relates to a sulfurized composition prepared by reacting a sulfurizing agent with a mixture of at least two reactants, one of which is (A) a partial fatty acid ester of a polyhydric alcohol. These partial fatty acid esters will contain at least one hydroxyl group in the alcohol portion of the ester; that is, not all of the hydroxyl groups of the polyhydric alcohol are converted to ester groups.

Suitable partial fatty acid esters of polyhydric alcohols are known and include, for example, glycol monoesters, glycerol mono- and diesters, and pentaerythritol di- and/or triesters. Partial fatty acid esters of glycerol are preferred. Of the glycerol esters, monoesters are preferred; that is, only one of the hydroxyl groups of a glycerol moiety is converted to an ester group. Partial fatty acid esters of polyhydric alcohols can be prepared by methods well known in the art, such as direct esterification of an acid and a polyol, reaction of a fatty acid with an epoxide, etc.

While it is possible to prepare the partial esters useful in this invention employing any of a variety of methods, they can, in a general sense, be considered as having been prepared from the reaction of a fatty acid and a polyhydric alcohol. Thus, the partial esters contain a moiety which can be considered as being derived from a fatty acid and a moiety which can be considered as being derived from a polyhydric alcohol. Although suitable sulfurized compositions of this invention can be prepared when reactant (A) is a saturated material, i.e., is essentially free of olefinic unsaturation, it is preferred that reactant (A) contains olefinic unsaturation. Such olefinic unsaturation usually appears in the acid moiety of the ester.

The term "fatty acid" as used in the specification and claims refers to acids which may be obtained by the hydrolysis of a naturally occurring vegetable or animal fat or oil. These acids usually contain from 8 to 22 carbon atoms and include, for example, caprylic acid, caproic acid, palmitic acid, stearic acid, oleic acid, linoleic acid, etc. Acids containing 16 to 20 carbon atoms are preferred, and those containing 16 to 18 carbon atoms are especially preferred.

As mentioned hereinabove, it is preferred that reactant (A) contains olefinic unsaturation, usually in the acid moiety of the ester. Suitable unsaturated acid moieties include those which can be considered as being derived from various fatty alkenoic acids, for example, octenoic acids, tetradecenoic acids and the like. Oleate esters are especially preferred.

Suitable polyhydric alcohols will have from 2 to about 12 carbon atoms, preferably from 2 to about 5 carbon atoms, and from 2 to about 8 hydroxyl groups, preferably 2 to 4 hydroxyl groups, most preferably about 3 hydroxyl groups. Examples of suitable polyhydric alcohols include ethylene glycol, propylene glycol, trimethylene glycol, neopentylene glycol, glycerol, pentaerythritol, etc. Ethylene glycol and glycerol are preferred; glycerol is especially preferred. Polyhydric alcohols containing alkoxy groups, particularly ethoxy groups or propoxy groups, are contemplated.

The partial fatty acid esters may be present as components of a mixture containing a variety of other components. The other components may include unreacted fatty acid, fully esterified polyhydric alcohols, and other materials. From the standpoint of economics, it is preferred that the partial fatty acid ester content of such a mixture is at least about 25%, more preferably at least about 50% by weight. In a particular embodiment, the monoester constitutes at least about 30% by weight of such a mixture, more preferably at least about 45% by weight.

As mentioned hereinabove, suitable partial fatty acid esters can be prepared by methods known in the art. One method for preparing monoglycerides of fatty acids from fats and oils is described in Birnbaum, U.S. Pat. No. 2,875,221. This patent teaches a continuous process for reacting glycerol and fats to provide a product having a high proportion of monoglyceride. Furthermore, many partial glycerol esters are commercially available. Such esters usually contain at least about 30% by weight of the preferred monoester, generally from about 35 to about 65% by weight monoester, about 30 to about 50% by weight diester, and the balance, in the aggregate, usually is no more than about 15%, more often less than about 10% by weight of triester, free fatty acid and other components.

Another method for preparing compositions comprising partial fatty acid esters of this invention is described in the following example.

EXAMPLE 1

A mixture of glycerol oleates is prepared by reacting 882 parts of a high oleic content sunflower oil which comprises about 80% oleic, about 10% linoleic and the balance saturated triglycerides, and which contains less than 1% by weight acidity measured as oleic acid, and 499 parts glycerol in the presence of a catalyst prepared by dissolving KOH in glycerol to yield a material containing about 16.7% by weight alkoxide. The reaction is conducted by heating the mixture to 155° C. under a nitrogen sparge, then heating under nitrogen, for 13 hours at 155° C. The materials are cooled to less than 100° C., then 9.05 parts 85% $H_3PO_4$ is added to neutralize the catalyst. The neutralized reaction mixture is transferred to a 2-liter separatory funnel. The lower layer is removed and discarded. The upper layer is the product which contains, by analysis, 56.9% by weight glycerol monooleate, 33.3% glycerol dioleate (primarily 1,2-) and 9.8% glycerol trioleate.

Repeating the procedure of this example generally provides products containing from about 54–57% by weight glycerol monooleate, about 33–36% by weight of glycerol dioleate and about 8–10% by weight glycerol trioleate.

Specific examples of commercially available materials comprising partial fatty acid esters of glycerol include Emery 2421 (Emery Industries, Inc.), Cap City GMO (Capital), DUR-EM 114, DUR-EM GMO, etc. (Durkee Industrial Foods, Inc.) and various materials identified under the mark Mazol GMO (Mazer Chemicals, Inc.). Other partial fatty acid esters of polyhydric alcohols are described in K. S. Markley, Ed., "Fatty Acids", second edition, parts I and V, Interscience Publishers (1968). Numerous commercially available fatty acid esters of polyhydric alcohols are listed by tradename and manufacturer in the two volumes: McCutcheon's Functional Materials and McCutcheon's Emulsifiers and Detergents, North American and International Editions (1987).

As previously described, the method of this invention comprises the reaction of a sulfurizing agent with a mixture of at least two reactants. Reactant (A), a partial fatty acid ester of a polyhydric alcohol, has been described hereinabove. Reactant (B) is at least one member of the group consisting of (1) at least one fatty acid ester of a polyhydric alcohol, which fatty acid ester is different from the partial ester (A),
(2) at least one fatty acid,
(3) at least one olefin, and
(4) at least one fatty acid ester of a monohydric alcohol.

Reactant (B)(1) is at least one fatty acid ester of a polyhydric alcohol. Reactant (B)(1) is different from the partial ester (A). Reactant (B)(1) may be a partial fatty acid ester, a full ester, or a mixture thereof. As in the case for Reactant (A), these fatty acid esters of polyhydric alcohols may be prepared in a variety of ways known in the art. As for reactant (A), reactant (B)(1) also may be considered as being derived from the reaction of a fatty acid with a polyhydric alcohol. The fatty acids and polyhydric alcohols from which reactant (B)(1) may be derived are the same as those described hereinabove for reactant (A). These fatty acid esters are also available from commercial sources, including several of those enumerated hereinabove for reactant (A). It is preferred that reactant (B)(1) contains a major amount of the fully esterified ester. Particularly preferred is where the fully esterified ester is a triglyceride, especially where the acid moiety is derived from oleic acid. Especially preferred are the fatty oils, that is, naturally occurring esters of glycerol with the above-noted long chain carboxylic acids and synthetic esters of similar structure. Still more preferred are fatty oils derived from unsaturated acids, especially oleic and linoleic, including such naturally occurring animal and vegetable oils as lard oil, peanut oil, cottonseed oil, soybean oil, corn oil, sunflower seed oil and others. Specially grown sunflowers yield an oil containing high amounts of oleic acid (e.g., greater than 80% or more by weight of oleic acid). Such sunflower oils are available commercially under the designation TRISUN ® from SVO Enterprises Corporation.

Reactant (B)(2) is at least one fatty acid. Thus, reactant (B)(2) may be at least one fatty acid as described hereinabove. It is usually an unsaturated fatty acid such as oleic or linoleic acid, and may be a mixture of acids such as is obtained from tall oil or by the hydrolysis of peanut oil, soybean oil or the like. Such fatty acids are commercially available from numerous sources.

Reactant (B)(3) is at least one olefin. This olefin is preferably an aliphatic olefin. That is, it is essentially free of aromatic groups such as phenyl groups, naphthyl groups and the like. The olefin usually will contain from about 4 to about 40 carbon atoms, preferably from about 8 to about 36 carbon atoms. Terminal olefins, or alpha-olefins, are preferred, especially those having from 12 to 20 carbon atoms. Olefins having internal double bonds are also useful. Mixtures of these olefins are commercially available, and such mixtures are contemplated for use in this invention.

Reactant (B)(4) is a fatty acid ester of a monohydric alcohol. Such a fatty acid ester is one which may be considered as being derived from a fatty acid as described hereinabove with an aliphatic monohydric alcohol such as methanol, ethanol, n-propanol, isopropanol, the butanols, etc. Mixtures thereof are also useful. Reactant (B)(4) can be prepared by methods well known in the art. Such fatty acid esters of monohydric alcohols are also commercially available from numerous sources.

As is apparent from the above discussion, (A) and the materials identified as reactants (B) contain various hydrocarbon groups such as alkyl or alkenyl groups, alkylene groups, etc. These hydrocarbon groups may contain non-hydrocarbon substituents or heteroatoms, provided such non-hydrocarbon substituents or heteroatoms do not significantly detract from the essentially hydrocarbon nature of the hydrocarbon group. Suitable non-hydrocarbon substituents include, but are not limited to, halo groups, such as chlorine, bromine, etc., mercapto groups, alkoxy groups, etc., and the like. Heteroatoms include, for example, sulfur, oxygen, nitrogen, and the like. Generally, there will be no more than one non-hydrocarbon group present per 10 carbon atoms in a hydrocarbon group. More preferably, no more than one such substituent or heteroatom is present per 20 carbon atoms. Preferably, the hydrocarbon groups are purely hydrocarbon; that is, they contain carbon and hydrogen, and are essentially free of non-hydrocarbon substituents or heteroatoms.

As mentioned hereinabove, the sulfurized compositions of this invention are prepared by sulfurizing a mixture of reactants, reactant (A) identified hereinabove, and at least one member of the group of reactants identified as reactants (B). The mixture usually contains from about 10 to about 90 percent by weight of reactant (A), more often from about 40 to about 70 percent by weight.

In addition to reactant (A), the mixture to be sulfurized contains at least one additional reactant selected from the group identified as reactants (B). The mixture may contain from about 10 to about 90 parts, often from about 10 to about 50 parts, and more often from about 10 to about 30 parts by weight of reactant (B)(1), or about 0.1 to about 15 parts, more often about 1 to about 5 parts by weight of reactant (B)(2), or about 10 to about 90 parts, often from about 15 to about 60 parts, more often from about 20 to about 40 parts by weight of reactant (B)(3), or about 1 to about 50 parts, often from about 5 to about 30 parts, more often from about 5 to about 15 parts of reactant (B)(4). Often, the mixture contains at least two members of the group of reactants identified as reactants (B). In a preferred embodiment, the mixture contains reactant (B)(3) and at least one other member of the group of reactants identified as reactants (B).

The sulfurization reaction generally is effected at an elevated temperature, often from about 50 to about 350° C., more preferably, at a temperature of from about 100° to about 210° C. The reaction is effected with efficient agitation and often in an inert atmosphere such as nitrogen. If any of the reactants are appreciably volatile at the reaction temperature, the reaction vessel may be sealed and maintained under pressure. Although generally not necessary, the reaction may be effected in the presence of an inert solvent such as an alcohol, ether, ester, aliphatic hydrocarbon, halogenated aromatic hydrocarbon, etc., which is a liquid within the temperature range employed for the reaction.

The sulfurizing agents useful in the process of the present invention include elemental sulfur, hydrogen sulfide, sulfur halide, sodium sulfide and a mixture of hydrogen sulfide and sulfur or sulfur dioxide, etc. Preferably, the sulfurizing agent is elemental sulfur. It is frequently advantageous to add the sulfurizing agent portionwise to the mixture of the other reactants. When elemental sulfur is utilized as a sulfurizing agent, the reaction is in some instances exothermic, which can be utilized as a cost-cutting benefit since no, or at least reduced, external heating may be required. The amount of sulfur or sulfurizing agent added to the reaction mixture can be varied over a wide range although the amount included in the reaction mixture should be an amount sufficient to provide a sulfurized composition containing the desired amount of sulfur.

Usually, the amount of sulfur or sulfurizing agent employed in the preparation of the sulfurized compositions of this invention is calculated based on the total olefinic unsaturation of the mixture. A monoolefinic reactant, such as an alpha-olefin or oleic acid, for example, contains one mole of olefinic bonds per mole of reactant. A polyolefinic material contains 2 or more moles of olefinic bonds. For example, 1,4-hexadiene contains 2 moles of olefinic bonds. In general, from about 0.01 to about 6 moles of sulfur, present as elemental sulfur or as sulfur present in another sulfurizing reactant, may be employed per mole of olefinic bonds. More often from 0.5 to about 3 moles of sulfur are employed per mole of olefinic bonds.

Accordingly, the sulfur content of any given sulfurized composition of this invention depends on the amount of sulfur present in the sulfurization mixture and on the nature and amount of the reactants present in the mixture comprising reactants (A) and (B). Compositions containing from 2 to about 40 percent by weight sulfur are common, and preferred are those containing from about 5 to about 25 percent by weight of sulfur.

The reaction may be conducted in the presence of various catalysts such as amines and other sulfurization catalysts known in the art. A number of useful catalysts are described in U.S. Pat. No. 4,191,659 which is expressly incorporated herein by reference for relevant disclosures in this regard.

Following the sulfurization reaction, it is preferred to remove substantially all low boiling materials, typically by venting the reaction vessel, by sparging with an inert gas such as nitrogen, by vacuum distillation or stripping, etc. Insoluble by-products may be removed by filtration if necessary, usually at an elevated temperature (about 50°–120° C.).

A further optional step in the preparation of the sulfurized compositions is treatment of the sulfurized composition obtained as described above to reduce any active sulfur which may be present. An illustrative method involves contacting the sulfurized composition with an alkali metal sulfide. Other optional treatments may be employed to improve product quality such as odor, color, and staining characteristics of the sulfurized compositions.

The following examples illustrate the preparation of the sulfurized composition of the present invention. These examples are presented for illustrative purposes only, and are not intended to limit the scope of this invention. Unless otherwise indicated in the examples and elsewhere in the specification and claims, all parts and percentages are by weight, and temperatures are in degrees Celsius.

EXAMPLE 2

To a 2-liter, 4-necked flask equipped with a stirrer, thermowell, reflux condenser to Dean-Stark trap and a sub-surface sparge tube is charged 330 parts of a mixture of $C_{16-18}$ alpha-olefins (Ethyl Corporation) and 670 parts of a mixture comprising, by analysis, 56 percent by weight glycerol monooleate (51.5% alpha-monooleate), 40.7% glycerol dioleate and 3.3 percent by weight glycerol trioleate and which has an iodine number of 74.60. The materials are heated, with stirring, to 150° under a nitrogen sparge. The nitrogen sparge is discontinued and 117 parts sulfur are added in two increments, 15 minutes apart. The temperature is increased to 195° C. and held at 195°–199° C. for 2 hours. The nitrogen sparge is resumed and heating is continued at 195°–199° C. for 2 hours. The reaction mixture is cooled and filtered through a diatomaceous earth filter aid. The filtrate, containing 9.94% sulfur by analysis, is the product.

EXAMPLE 3

A 3-liter, 4-necked flask equipped with a stirrer, thermowell, reflux condenser to Dean-Stark trap and sub-surface gas sparge tube is charged with 2000 parts of the glycerol oleate mixture described in Example 2. The material is heated under a nitrogen sparge to 145° C. The nitrogen sparge is discontinued and 116 parts sulfur is added in two increments, 20 minutes apart. The mixture is heated to 195° C. and held at 195° C. for 2 hours. The nitrogen sparge is resumed and the reaction mixture is held for 3 additional hours at 195° C. The reaction mixture is filtered through diatomaceous earth at 75° C. The filtrate, containing 5.40% sulfur by analysis, is the product.

EXAMPLE 4

Following a procedure essentially the same as that of Example 2, 425 parts of a glycerol oleate mixture comprising about 60% glycerol monooleate (57.1% alpha-monooleate) and having an iodine number of 72.9, 75 parts of a mixture of $C_{16-18}$ alpha-olefins (Neodene TM 16-18, Shell) and 58.7 parts sulfur are reacted yielding a sulfurized product containing 9.85% sulfur by analysis.

EXAMPLE 5

A 1-liter, 4-necked flask equipped with a stirrer, thermowell, reflux condenser to Dean-Stark trap and sub-surface gas inlet tube is charged with 75 parts of the $C_{16-18}$ alpha-olefin mixture of Example 4, 50 parts oleic acid (Pamolyn 100) and 375 parts of the glycerol oleate mixture described in Example 4. The mixture is heated to 145° C., 58.7 parts sulfur are added in two increments, 15 minutes apart, and heating is continued while the temperature increases to 195° C. The reaction is continued at 195° C. for 1.5 hours followed by an additional 2 hours at 195° with a nitrogen sparge. The materials are filtered at 90° C. through a diatomaceous earth filter aid. The filtrate, containing 9.54% sulfur by analysis, is the product.

EXAMPLE 6

Following a procedure essentially the same as that for Example 5, 50 parts of oleic acid, 150 parts of $C_{16-18}$ alpha-olefin mixture, and 300 parts glycerol oleate mixture (each reactant as described in Examples 4 and 5 hereinabove) are reacted with 58.7 parts sulfur yielding a sulfurized material containing 10.05% sulfur by analysis.

EXAMPLE 7

A 1-liter, 4-necked flask equipped with a stirrer, thermowell, reflux condenser to Dean-Stark trap and a sub-surface gas inlet tube is charged with 45 parts soybean oil, 75 parts of a mixture of $C_{16-18}$ alpha-olefins (Neodene TM 16-18, Shell), 50 parts oleic acid (Pamolyn 100) and 330 parts of the glycerol oleate mixture described in Example 4. This mixture is heated to 145° C. under a nitrogen sparge. Nitrogen is discontinued, and 58.7 parts sulfur are added in two increments, 15 minutes apart. The materials are heated to 195° C. and held at 195° C. for 1.5 hours. A nitrogen sparge is resumed and heating is continued at 195° C. for 2 hours. The reaction mixture is filtered at 95° C. through a diatomaceous earth filter aid. The filtrate, containing 9.95% sulfur by analysis, is the product.

EXAMPLE 8

A 1-liter, 4-necked flask equipped with a stirrer, thermowell, reflux condenser to Dean-Stark trap and a sub-surface gas inlet tube is charged with 75 parts of a mixture of $C_{16-18}$ alpha-olefins (Neodene TM 16-18, Shell), 95 parts soybean oil and 330 parts of the glycerol oleate mixture described in Example 4. This mixture is heated to 145° C. under a nitrogen sparge. The nitrogen sparge is discontinued, and 58.7 parts sulfur are added in two increments, 15 minutes apart. The mixture is heated to 195° C. and held at 195° C. for 1.5 hours. The nitrogen sparge is resumed and the reaction is continued at 195° C. for 2 hours. The mixture is filtered at 90° C. through a diatomaceous earth filter aid. The filtrate, containing 9.74% sulfur by analysis, is the product.

EXAMPLE 9

Following essentially the same procedure as described in Example 8 and employing ingredients described in that example, 330 parts soybean oil, 95 parts glycerol oleate mixture and 75 parts $C_{16-18}$ alpha-olefin mixture is reacted with 58.7 parts sulfur. The resulting product contains 10.2% sulfur by analysis.

EXAMPLE 10

The glycerol oleate mixture described in Example 2 is distilled employing a thin-film evaporator at 240°–250° C. at 0.25 millimeters mercury pressure. The distillate obtained contains 95.8 percent by weight glycerol monooleate and 4.2 percent by weight glycerol dioleate by analysis. A mixture of 425 parts of this distillate, 425 parts soybean oil and 150 parts of a $C_{16-18}$ alpha-olefin mixture (Ethyl) is heated to 145° C. followed by the addition of 117 parts sulfur in three increments over 0.25 hour. The temperature is increased to 195° C. and held at 195° C. for 1.5 hours. A nitrogen sparge is begun and heating is continued for 2.5 hours at 195° C. The reaction mixture is filtered at 75° C. through a diatomaceous earth filter aid. The filtrate, containing 9.66% sulfur by analysis, is the product.

EXAMPLE 11

Following essentially the procedure of Example 10, 190 parts of the glycerol monooleate distillate described in Example 10, 660 parts soybean oil and 150 parts of $C_{16-18}$ alpha-olefin mixture (Ethyl) are reacted with 117 parts sulfur. The product obtained contains 9.84% sulfur by analysis.

EXAMPLE 12

Following essentially the procedure of Example 10, 660 parts of the glycerol oleate distillate described in Example 10, 190 parts soybean oil and 150 parts of $C_{16-18}$ alpha-olefin mixture (Ethyl) are reacted with 117 parts sulfur. The product obtained contains 9.7% sulfur by analysis.

EXAMPLE 13

A 2-liter, 4-necked flask equipped with a stirrer, thermowell, reflux condenser and sub-surface sparge tube is charged with 1000 parts soybean oil, 454 parts of glycerol oleate mixture prepared according to the procedure of Example 1 and 53 parts oleic acid (Pamolyn 100). The materials are heated to 145° C. under a nitrogen sparge. Nitrogen sparging is discontinued and 176 parts sulfur are added in three increments at 145° C. The mixture is heated to 195° C. and held at 195° C. for 1.5 hours. Nitrogen sparging is resumed and the reaction is continued at 195° C. for 5 hours. The materials are cooled and filtered through a diatomaceous earth filter aid. The filtrate, containing 9.34% sulfur by analysis, is the product.

EXAMPLE 14

A 2-liter, 4-necked flask equipped with a stirrer, thermowell, reflux condenser and sub-surface gas inlet tube is charged with 500 parts soybean oil, 500 parts of a glycerol oleate mixture prepared according to the procedure of Example 1, 454 parts of a $C_{16-18}$ alpha-olefin mixture (Shell) and 53 parts oleic acid (Pamolyn 100). The materials are heated to 145° C. under a nitrogen sparge. The nitrogen sparge is then discontinued and 176 parts sulfur are added in three increments over a period of 0.25 hours. The reaction mixture is heated to 195° C. and held at 195° C. for 1.5 hours. The nitrogen sparge is resumed and the reaction is continued for 3 hours at 195° C. The reaction mixture is then cooled and filtered through a diatomaceous earth filter aid. The filtrate, containing 9.71% sulfur by analysis, is the product.

EXAMPLE 15

A 2-liter, 4-necked flask equipped with a stirrer, thermowell, reflux condenser to a Dean-Stark trap and a sub-surface sparge tube is charged with 1000 parts sunflower seed oil similar to that used in Example 1, 500 parts of the glycerol oleate mixture described in Example 14 and 53 parts oleic acid (Pamolyn 100). The materials are heated to 145° C. under a nitrogen sparge, then the nitrogen sparge is discontinued. In three increments, 176 parts sulfur are added at 145° C. The materials are heated to 195° C. and held at 195° C. for 1.5 hours. The nitrogen sparge is restarted and the reaction is continued at 195° C. for 3 hours. The reaction mixture is cooled and filtered through a diatomaceous earth filter aid. The filtrate, containing 9.25% sulfur by analysis, is the product.

EXAMPLE 16

Following essentially the same procedure as employed in Example 15, 1000 parts of the glycerol oleate mixture of Example 1, 454 parts of $C_{16-18}$ alpha-olefin mixture (Shell) and 53 parts oleic acid (Pamolyn 100) are reacted with 176 parts sulfur. The product obtained contains 9.40% sulfur by analysis.

EXAMPLES 17-24

Examples 2-9 are repeated, replacing the glycerol oleate mixtures with a commercial pentaerythritol dioleate described as having an acid number of less than 1.5, a hydroxyl value of 120-130 and an iodine number of 81-87.

The sulfurized compositions of this invention are useful as oil-soluble lubricant additives providing friction modification, anti-wear and extreme pressure performance. They also impart energy conserving properties to lubricants containing them. Thus, they are useful in automotive lubricants, such as engine oils and drivetrain lubricants, which are intended for use when it is desired to reduce fuel consumption. These energy conserving properties are also useful in industrial applications when it is desired to reduce the power requirements, such as electrical power requirements, and consequently the cost, of operating industrial machinery. Depending on the particular nature and composition of the sulfurized composition, additional benefits such as anti-oxidancy, corrosion inhibition, and the like may be obtained. The sulfurized compositions of this invention have been shown to improve wear and extreme pressure performance in manual transmission fluids without sacrificing friction modification. The lubricating oil compositions of this invention comprise a major amount of an oil of lubricating viscosity and a minor amount of the sulfurized compositions of this invention. By a major amount is meant more than 50%. Thus, 51%, 80% and 99% are major amounts. A minor amount is less than 50%. Examples of minor amounts are 1%, 25% and 49%. The amount of sulfurized composition used will, of course, depend in part on whether it contains a diluent and on other characteristics of the composition. The sulfurized compositions of this invention are used in an effective amount to provide the above-described properties and benefits. Typically, on a neat chemical basis, it is employed to provide from about 0.25 to about 20% by weight of the sulfurized composition to the finished lubricating oil. More often, it is used at about 0.5 to about 10%, preferably from about 1 to about 5% by weight of the finished lubricating oil.

The lubricating oil compositions may be prepared by dissolving or suspending the sulfurized compositions of this invention directly in the base oil, along with any other additives which may be desired. More often, the sulfurized composition is present as a component of an additive concentrate which may contain other additives as well and which usually will contain an inert organic diluent. Such additive concentrates usually comprise from about 1 to 90% by weight of the sulfurized compositions of this invention.

The lubricating compositions and methods of this invention employ an oil of lubricating viscosity, including natural or synthetic lubricating oils and mixtures thereof.

Natural oils include animal oils and vegetable oils (e.g. castor oil, lard oil) as well as mineral lubricating oils such as liquid petroleum oils and solvent-treated or acid-treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins, etc. and mixtures thereof, alkylbenzenes, polyphenyl (e.g., biphenyls, terphenyls, alkylated polyphenyls, etc), alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used.

Another suitable class of synthetic lubricating oils that can be used comprises the esters of dicarboxylic acids and those made from $C_5$ to $C_{12}$ monocarboxylic acids and polyols and polyol ethers.

Other synthetic lubricating oils include liquid esters of phosphorus-containing acids, polymeric tetrahydrofurans and the like, silicon-based oils such as the polyalkyl-, polyaryl-, polyalkoxy-, or polyaryloxysiloxane oils and silicate oils.

Unrefined, refined and rerefined oils, either natural or synthetic (as well as mixtures of two or more of any of these) of the type disclosed hereinabove can be used in the compositions of the present invention. Unrefined oils are those obtained directly from a natural or synthetic source without further purification treatment. Refined oils are similar to the unrefined oils except they have been further treated in one or more purification steps to improve one or more properties. Rerefined oils are obtained by processes similar to those used to obtain refined oils applied to refined oils which have been already used in service. Such rerefined oils often are additionally processed by techniques directed to removal of spent additives and oil breakdown products.

Specific examples of the above-described oils of lubricating viscosity are given in Chamberlin III, U.S. Pat. No. 4,326,972 and European Patent Publication 107,282, both of which are hereby incorporated by reference for relevant disclosures contained therein.

A basic, brief description of lubricant base oils appears in an article by D. V. Brock, "Lubrication Engineering", Volume 43, pages 184-5, March, 1987, which article is expressly incorporated by reference for relevant disclosures contained therein.

OTHER ADDITIVES

As mentioned, the lubricating oil compositions of this invention may contain other components as additives intended to enhance one or more properties of the lubricant. The use of such additives is optional and the presence thereof in the lubricating oil compositions of this invention will depend on the particular use and level of performance required. The lubricating oil compositions may comprise a zinc salt of a dithiophosphoric acid. Zinc salts of dithiophosphoric acids are often referred to as zinc dithiophosphates, zinc 0,0-dihydrocarbyl dithiophosphates, and other commonly used names. They are sometimes referred to by the abbreviation ZDP. One or more zinc salts of dithiophosphoric acids may be present in a minor amount to provide additional extreme pressure, anti-wear and anti-oxidancy performance.

In addition to zinc salts of dithiophosphoric acids discussed hereinabove, other additives that may optionally be used in the lubricating oil compositions of this invention include, for example, detergents, dispersants, viscosity improvers, oxidation inhibiting agents, pour point depressing agents, extreme pressure agents, anti-wear agents, color stabilizers and anti-foam agents. The above-mentioned additives are used in addition to the sulfurized compositions of this invention.

Auxiliary extreme pressure agents and corrosion and oxidation inhibiting agents which may be included in the lubricating compositions of the invention are exemplified by chlorinated aliphatic hydrocarbons, organic sulfides and polysulfides, phosphorus esters including dihydrocarbon and trihydrocarbon phosphites, molybdenum compounds, and the like.

Viscosity improvers (also sometimes referred to as viscosity index improvers) may be included in the lubricating compositions of this invention. Viscosity improvers are usually polymers, including polyisobutenes, polymethacrylic acid esters, diene polymers, polyalkyl styrenes, alkenylarene-conjugated diene copolymers and polyolefins. Multifunctional viscosity improvers which also have dispersant and/or antioxidancy properties are known and may optionally be used in addition to the products of this invention.

Pour point depressants are a particularly useful type of additive often included in the lubricating oils described herein. See for example, page 8 of "Lubricant Additives" by C. V. Smalheer and R. Kennedy Smith (Lezius-Hiles Company Publishers, Cleveland, OH, 1967). Pour point depressants useful for the purpose of this invention, techniques for their preparation and their use are described in U.S. Pat. Nos. 2,387,501; 2,015,748; 2,655,479; 1,815,022; 2,191,498; 2,666,748; 2,721,877; 2,721,878; and 3,250,715 which are expressly incorporated by reference for their relevant disclosures.

Anti-foam agents used to reduce or prevent the formation of stable foam include silicones or organic polymers. Examples of these and additional anti-foam compositions are described in "Foam Control Agents", by Henry T. Kerner (Noyes Data Corporation, 1976), pages 125-162.

Detergents and dispersants may be of the ash-producing or ashless type. The ash-producing detergents are exemplified by oil soluble neutral and basic salts of alkali or alkaline earth metals with sulfonic acids, carboxylic acids, phenols or organic phosphorus acids characterized by at least one direct carbon-to-phosphorus linkage.

The term "basic salt" is used to designate metal salts wherein the metal is present in stoichiometrically larger amounts than the organic acid radical. Basic salts and techniques for preparing and using them are well known to those skilled in the art and need not be discussed in detail here.

Ashless detergents and dispersants are so-called despite the fact that, depending on its constitution, the detergent or dispersant may upon combustion yield a non-volatile residue such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Pat. No. 1,306,529 and in many U.S. Pat. Nos. including the following:

| | | |
|---|---|---|
| 3,163,603 | 3,381,022 | 3,542,680 |
| 3,184,474 | 3,399,141 | 3,567,637 |
| 3,215,707 | 3,415,750 | 3,574,101 |
| 3,219,666 | 3,433,744 | 3,576,743 |
| 3,271,310 | 3,444,170 | 3,630,904 |
| 3,272,746 | 3,448,048 | 3,632,510 |
| 3,281,357 | 3,448,049 | 3,632,511 |
| 3,306,908 | 3,451,933 | 3,697,428 |
| 3,311,558 | 3,454,607 | 3,725,441 |
| 3,316,177 | 3,467,668 | 4,194,886 |
| 3,340,281 | 3,501,405 | 4,234,435 |
| 3,341,542 | 3,522,179 | 4,491,527 |
| 3,346,493 | 3,541,012 | RE 26,433 |
| 3,351,552 | 3,541,678 | |

(2) Reaction products of relatively high molecular weight aliphatic or alicyclic halides with amines, preferably polyalkylene polyamines. These may be characterized as "amine dispersants" and examples thereof are described for example, in the following U.S. Pat. Nos.:

| | |
|---|---|
| 3,275,554 | 3,454,555 |
| 3,438,757 | 3,565,804 |

(3) Reaction products of alkyl phenols in which the alkyl groups contains at least about 30 carbon atoms with aldehydes (especially formaldehyde) and amines (especially polyalkylene polyamines), which may be characterized as "Mannich dispersants". The materials described in the following U.S. Pat. Nos. are illustrative:

| | |
|---|---|
| 3,413,347 | 3,725,480 |
| 3,697,574 | 3,726,882 |
| 3,725,277 | |

(4) Products obtained by post-treating the carboxylic amine or Mannic dispersants with such reactants as urea, thiourea, carbon disulfide, aldehydes, ketones, carboxylic acids, hydrocarbon-substituted succinic anhydrides, nitriles, epoxides, boron compounds, phosphorns compounds or the like. Exemplary materials of this kind are described in the following U.S. Pat. Nos.:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |
| | | | 4,234,435 |

(5) Interpolymers of oil-solubilizing monomers such as decyl methacrylate, vinyl decyl ether and high molecular weight olefins with monomers containing polar substituents, e.g., aminoalkyl acrylates or methacrylates, acrylamides and poly-(oxyethylene)-substituted acrylates. These may be characterized as "polymeric dispersants" and examples thereof are disclosed in the following U.S. Pat. Nos.:

| | |
|---|---|
| 3,329,658 | 3,666,730 |
| 3,449,250 | 3,687,849 |
| 3,519,565 | 3,702,300 |

The above-noted patents are incorporated by reference herein for their disclosures of ashless dispersants.

The above-illustrated additives may each be present in lubricating compositions at a concentration of as little as 0.001% by weight usually ranging from about 0.01% to about 20% by weight. In most instances, they each contribute from about 0.1% to about 10% by weight.

The various additives described herein can be added directly to the lubricant. Preferably, however, they are diluted with a substantially inert, normally liquid organic diluent such as mineral oil, naphtha, benzene, toluene or xylene, to form an additive concentrate. These additive concentrates usually comprise about 1 to about 90% by weight of the sulfurized compositions of this invention and may contain, in addition, one or more other additives known in the art or described hereinabove. Concentrations such as 15%, 20%, 30% or 50% or higher may be employed.

The lubricating oil compositions of this invention find utility in many areas. Examples are lubricants for internal combustion engines, especially fuel economy improving oils, power transmission fluids such as automatic transmission fluids, hydraulic fluids, power-shift oils, and tractor oils. Tractor oils frequently serve multiple purposes such as hydraulic fluids, wet brake lubricants, engine lubricants, etc., all employing a lubricant from a common sump. Other areas of application include industrial applications such as metal-working fluids and industrial gear oils. The sulfurized compositions of this invention may also be employed in aqueous fluids including those described in several Forsberg patents, for example, U.S. Pat. No. 4,329,429, U.S. Pat. No. 4,368,133, U.S. Pat. No. 4,448,703, and in other aqueous compositions.

The lubricating compositions of this invention are illustrated by the following examples. The lubricating compositions are prepared by combining the specified ingredients, individually or from concentrates, in the indicated amounts and oil of lubricating viscosity to make the total 100 parts by weight. The amounts shown are parts by weight and, unless indicated otherwise, are amounts of chemical present on an oil-free basis. Thus, for example, an additive comprising 50% oil used at 10% by weight in a blend, provides 5% by weight of chemical. These examples are presented for illustrative purposes only, and are not intended to limit the scope of this invention.

EXAMPLE A

A lubricating oil composition formulated for use as an automatic transmission fluid is prepared by combining a mineral oil basestock (100 neutral oil—Cities Service Stocks), 0.042% of a commercial silicone antifoam, 0.025% of a commercial red dye, and 15.70% of an additive concentrate contributing 1.16% of the reaction product of polyisobutenyl succinic anhydride with ethylene polyamine, post-treated with $CS_2$, 0.67% of a borated reaction product of polyisobutenyl succinic anhydride with ethylene polyamine, 0.54% basic calcium sulfonate, 0.5% hydroxythioether, 0.06% zinc dialkylphosphorodithioate, 0.5% of the product of Example 16, 0.08% of an alkylated diaryl amine+0.11% N-tallow diethanolamine+5% alkylated benzene (Alkylate A-215, Monsanto)+1.98% of an amine treated styrene-maleate copolymer and 5.1% oil diluent.

EXAMPLE B

A lubricating oil composition formulated for use as a metal-working fluid is prepared by combining a mineral oil basestock as described in Example A with 1.35% of a basic calcium sulfonate and 2.5% of the product of Example 16.

EXAMPLE C

A lubricating oil composition such as described in Example A is prepared, which contains, in addition to the ingredients employed in Example A, 0.42% of a borated fatty epoxide.

Typical gear lubricating oil compositions of this invention are illustrated in the following Tables and Examples:

TABLE I

Examples D-K
Mineral oil (Shell International Petroleum - SAE 80W) basestock + 0.40% amine treated styrene-alkyl maleate copolymer + 7.70% of an additive concentrate contributing 2.12% of a zinc salt of an alkyl carboxylic acid - dialkyl phosphorodithioate mixture + 0.31% of the reaction product of a N,N-dialkyl alkanolamine with polyisobutenyl succinic anhydride + 1.76% basic calcium petroleum sulfonate + 2.51% mineral oil diluent + 1% of the product listed below:

| Example | Product of Example |
|---------|-------------------|
| D | 4 |
| E | 5 |
| F | 6 |
| G | 7 |
| H | 8 |
| I | 9 |
| J | 2 |
| K | 16 |

TABLE II

Examples L-O
Mineral oil (Shell International Petroleum - SAE 80W) + 0.40% amine treated styrene-alkyl maleate copolymer + 100 ppm of a silicone antifoam + 7.70% of an additive concentrate contributing 2.12% of a zinc salt of an alkyl carboxylic acid-dialkyl phosphorodithioate mixture + 0.31% of the reaction product of a N,N-dialkyl alkanolamine with polyisobutenyl succinic anhydride + 1.76% basic calcium sulfonate + 0.75% of a borated basic alkali metal sulfonate sulfonate + 1% of the product listed below:

| Example | Product of Example |
|---------|-------------------|
| L | 9 |
| M | 14 |
| N | 15 |
| O | 16 |

EXAMPLE P

A lubricating oil composition is prepared by combining in a mineral oil (Shell International Petroleum—SAE 90) base, 7.70% of the additive concentrate described in Example K and 0.30% of a commercial pour depressant identified as Shellswim 140 (Shell International).

EXAMPLE Q

A lubricating oil composition is prepared by combining a synthetic oil basestock (SAE 80W—4 centistokes polyolefin—Gulf Oil Chem) with 20% by weight of a solution of 90 parts polyisobutenes (MW about 1900, measured by vapor phase osmometry) in 10 parts mineral oil diluent, 1% by weight of a solution of 40 parts amine treated styrene-alkyl maleate copolymer in 60 parts mineral oil, 15% of an alkylated benzene and 7.70% of the additive concentrate described in Example O.

EXAMPLE R

A lubricating oil composition is prepared by combining in the mineral oil described in Example P, 0.30% of a commercial pour depressant identified as Shellswim 140 (Shell International), 7% of an additive concentrate which contributes 1.16% of a $C_{11-14}$ t-alkyl amine salt of the reaction product of $P_2O_5$ with hydroxypropyl O,O-di(4-methyl-2-pentyl) phosphorodithioate, 0.56% of a borated reaction product of an ethylene polyamine with polyisobutenyl succinic anhydride, 0.02% of a polyoxyalkylene demulsifier, 700 ppm of a polyacrylate antifoam, 0.09% of a fatty amide, 3.5% of a sulfurized isobutylene and 0.11% of a solution of 80 parts of the reaction product of an alkylated phenol, $(CH_2O)_x$ and dimercaptothiadiazole in 20 parts of an aromatic diluent, and 1% of the product of Example 16.

TABLE III

Examples S-AA
A series of lubricating oil compositions for use as tractor transmission lubricants is prepared by combining a mineral oil basestock (Sun Tulsa J20B), 5.75% of a mixture of mineral oil solution (approx. 60% oil) of amine treated styrene-alkyl maleate copolymers, 0.02% of a 10% solution of a silicone antifoam in kerosene and 6.40% of an additive concentrate which contributes the following listed components:

| Component | Percent by Weight in Oil Blend Example | | | | | | | | |
|---|---|---|---|---|---|---|---|---|---|
|  | S | T | U | V | W | X | Y | Z | AA |
| Zinc salt of alkyl carboxylate-dialkyl phosphorodithioate mixture | 1.87 | 1.87 | 1.87 | 1.87 | 1.87 | 1.87 | 1.87 | 2.12 | 2.12 |

TABLE III-continued

Examples S-AA

A series of lubricating oil compositions for use as tractor transmission lubricants is prepared by combining a mineral oil basestock (Sun Tulsa J20B), 5.75% of a mixture of mineral oil solution (approx. 60% oil) of amine treated styrene-alkyl maleate copolymers, 0.02% of a 10% solution of a silicone antifoam in kerosene and 6.40% of an additive concentrate which contributes the following listed components:

| Component | Percent by Weight in Oil Blend Example | | | | | | | | |
|---|---|---|---|---|---|---|---|---|---|
| | S | T | U | V | W | X | Y | Z | AA |
| Basic calcium sulfonate | 1.72 | 1.72 | 1.72 | 1.72 | 1.72 | 1.72 | 1.72 | 1.95 | 1.43 |
| Diluent oil | 2.01 | 2.01 | 2.01 | 2.26 | 2.26 | 2.01 | 2.26 | 2.32 | |
| Boronated basic alkali metal sulfonate | | | | 0.75 | 0.75 | | 0.75 | | 0.38 |
| Reaction product - N,N-dialkylalkanolamine with polyisobutenyl succinic anhydride | | | | 0.3 | 0.3 | 0.3 | 0.3 | 0.31 | 0.31 |
| Product of Example 2 | 0.8 | | | | | | | | |
| Product of Example 10 | | 0.8 | | | | | | | |
| Product of Example 16 | | | 0.8 | | | 0.8 | 0.8 | 1.0 | 1.0 |
| Product of Example 14 | | | | 0.8 | | | | | |
| Product of Example 15 | | | | | 0.8 | | | | |

The benefits provided by the sulfurized compositions of this invention are illustrated by the test results presented below. The Timken test is a well-known procedure used to determine the load-carrying ability of a lubricant. It is described in the American Society for Testing and Material procedure ASTM D-2782-77.

Gear Lubricants are prepared from an SAE 80W basestock (Texaco) to which is added 15% of an alkylated benzene, 10% of an acrylate polymer viscosity improver, (Texaco TC10124), 0.4% of an amine treated styrene-alkyl maleate copolymer, 100 ppm of a silicone antifoam and 7.70% by weight of an additive concentrate contributing 2.12% of a zinc salt of an alkyl carboxylic acid-dialkyl phosphorodithioate mixture, 0.31% of the reaction product of a N,N-dialkyl alkanolamine with polyisobutenyl succinic anhydride, 1.76% of basic calcium sulfonate, 0.75% of basic borated alkali metal sulfonate, 1% of the product listed below and mineral oil diluent:

| Example | Product of Example | Timken (ASTM-2782) | |
|---|---|---|---|
| | | OK Load | PSI |
| AB | Example 12, U.S. 3,953,347 | 55 lb. 60 lb. | 32,850 psi 35,825 psi |
| AC | Example 13 | 95 lb. 95 lb. | 40,000 psi 40,000 psi |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A sulfurized composition prepared by reacting at an elevated temperature a sulfurizing agent with a mixture of reactants comprising:
   (A) at least one partial fatty acid ester of a polyhydric alcohol, and
   (B) (2) at least one fatty acid.

2. The composition of claim 1 wherein the mixture of reactants further comprises
   (B) at least one member of the group consisting of
   (1) at least one fatty acid ester of a polyhydric alcohol, which fatty acid ester is different from the partial fatty acid ester (A),
   (3) at least one olefin, and
   (4) at least one fatty acid ester of a monohydric alcohol.

3. The composition according to claim 1 wherein reactant (A) comprises a component of a fatty oil.

4. The composition according to claim 1 wherein reactant (A) comprises a fatty acid ester of glycerol.

5. The composition of claim 4 wherein reactant (A) comprises glycerol monooleate.

6. The composition of claim 4 wherein reactant (A) comprises a mixture of glycerol monooleate, glycerol dioleate and glycerol trioleate.

7. The composition according to claim 1 wherein reactant (B) (2) comprises oleic acid.

8. A composition according to claim 1 wherein the sulfurizing agent is sulfur, sulfur dioxide, hydrogen sulfide or mixtures of two or more of these.

9. The composition according to claim 1 wherein the mixture comprises from about 10 to about 90 percent by weight of reactant (A).

10. The composition according to claim 2 wherein reactant (B) (1) is a component of a fatty oil, said oil containing at least about 50 percent by weight of a full fatty acid ester of a polyhydric alcohol.

11. The composition according to claim 2 wherein reactant (B) (3) is at least one aliphatic olefin containing from about 4 to about 40 carbon atoms.

12. The composition according to claim 11 wherein reactant (B) (3) is at least one alpha-olefin having from about 12 to about 20 carbon atoms.

13. The composition according to claim 2 wherein reactant (B) (4) comprises methyl oleate.

14. The composition of claim 9 which comprises
   (B) (2) from about 0.1 to about 15 parts by weight of at least one fatty acid.

15. The composition of claim 14 wherein the mixture of reactants further comprises
   (B) at least one member of the group consisting of (1) at least one fatty acid ester of a polyhydric alcohol, which fatty acid ester is different from the partial fatty acid ester (A),
(3) at least one olefin, and
(4) at least one fatty acid ester of a monohydric alcohol.

16. The composition of claim 15 wherein the mixture comprises
(B) (1) from about 10 to about 90 parts by weight of at least one fatty acid ester of a polyhydric alcohol, which fatty acid ester is different from the partial ester (A).

17. The composition of claim 15 wherein the mixture comprises
(B) (3) from about 10 to about 60 parts by weight of at least one olefin.

18. The composition of claim 15 wherein the mixture comprises
(B) (4) from about 10 to about 90 parts by weight of at least one fatty acid ester of a monohydric alcohol.

19. The composition of claim 16 wherein the mixture further comprises
(B) (4) from about 10 to about 90 parts by weight of at least one fatty acid ester of a monohydric alcohol.

20. The composition of claim 17 wherein the mixture further comprises
(B) (4) from about 10 to about 90 parts by weight of at least one fatty acid ester of a monohydric alcohol.

21. The composition of claim 16 wherein the mixture further comprises
(B) (3) from about 10 to about 60 parts by weight of at least one olefin.

22. The composition of claim 15 wherein the mixture comprises
(B) (1) from about 10 to about 90 parts by weight of at least one fatty acid ester of a polyhydric alcohol, which fatty acid ester is different from the partial ester (A),
(B) (3) from about 10 to about 60 parts by weight of at least one olefin, and
(B) (4) from about 10 to about 90 parts by weight of at least one fatty acid ester of a monohydric alcohol.

23. The composition according to claim 22 wherein the mixture comprises
(B) (1) from about 10 to about 50 parts by weight of at least one fatty acid ester of a polyhydric alcohol,
(B) (3) from about 10 to about 50 parts by weight of at least one olefin, and
(B) (4) from about 10 to about 30 parts by weight of at least one fatty acid ester of a monohydric alcohol.

24. A sulfurized composition prepared by reacting at 100°–210° C. a sulfurizing agent comprising elemental sulfur with a mixture of reactants comprising:
(A) about 10 to about 90 percent by weight of at least one partial fatty acid ester of a polyhydric alcohol,
(B) (2) at least one fatty acid, and
(B) at least one member of the group consisting of
(1) at least one fatty acid ester of a polyhydric alcohol, which fatty acid ester is different from the partial fatty acid ester (A),
(3) at least one olefin, and
(4) at least one fatty acid ester of a monohydric alcohol.

25. The composition according to claim 24 wherein reactant (A) comprises a fatty acid ester of glycerol.

26. The composition of claim 25 wherein component (A) comprises glycerol monooleate.

27. The composition of claim 25 wherein component (A) comprises a mixture of glycerol monooleate, glycerol dioleate and glycerol trioleate.

28. The composition according to claim 24 wherein reactant (B) (2) comprises oleic acid.

29. The composition according to claim 24 wherein reactant (B) (1) comprises a fatty oil comprising at least 50 percent by weight of a full fatty acid ester of a polyhydric alcohol.

30. The composition according to claim 24 wherein reactant (B) (3) is at least one aliphatic alpha-olefin containing from about 4 to about 40 carbon atoms.

31. The composition according to claim 24 wherein reactant (B) (4) comprises methyl oleate.

32. An additive concentrate for use in preparing lubricating compositions comprising a substantially inert, normally liquid diluent and about 1–90% by weight of the sulfurized composition of claim 1.

33. An additive concentrate for use in preparing lubricating compositions comprising a substantially inert, normally liquid diluent and about 1–90% by weight of the sulfurized composition of claim 24.

34. A lubricating composition comprising a major amount of an oil of lubricating viscosity and a minor amount of the sulfurized composition of claim 1.

35. A lubricating composition comprising a major amount of an oil of lubricating viscosity and a minor amount of the sulfurized composition of claim 15.

36. A lubricating composition comprising a major amount of an oil of lubricating viscosity and a minor amount of the sulfurized composition of claim 22.

37. A lubricating composition comprising a major amount of an oil of lubricating viscosity and a minor amount of the sulfurized composition of claim 23.

38. A lubricating composition comprising a major amount of an oil of lubricating viscosity and a minor amount of the sulfurized composition of claim 24.

39. A lubricating composition comprising a major amount of an oil of lubricating viscosity and a minor amount of the sulfurized composition of claim 28.

40. A lubricating composition comprising a major amount of an oil of lubricating viscosity and a minor amount of the sulfurized composition of claim 30.

41. A lubricating composition comprising a major amount of an oil of lubricating viscosity and a minor amount of the sulfurized composition of claim 31.

* * * * *